US011312364B2

(12) United States Patent
Itagaki

(10) Patent No.: US 11,312,364 B2
(45) Date of Patent: Apr. 26, 2022

(54) HYBRID VEHICLE

(71) Applicant: TOYOTA JIDOSHA KABUSHIKI KAISHA, Toyota (JP)

(72) Inventor: Kenji Itagaki, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 16/851,375

(22) Filed: Apr. 17, 2020

(65) Prior Publication Data

US 2020/0361443 A1 Nov. 19, 2020

(30) Foreign Application Priority Data

May 14, 2019 (JP) .............................. JP2019-091103

(51) Int. Cl.
| | |
|---|---|
| *B60T 7/12* | (2006.01) |
| *B60W 20/15* | (2016.01) |
| *B60W 10/06* | (2006.01) |
| *B60W 10/08* | (2006.01) |
| *B60W 30/188* | (2012.01) |
| *B60W 50/00* | (2006.01) |

(52) U.S. Cl.
CPC ............ *B60W 20/15* (2016.01); *B60W 10/06* (2013.01); *B60W 10/08* (2013.01); *B60W 30/1882* (2013.01); *B60W 2050/0026* (2013.01); *B60W 2510/081* (2013.01); *B60W 2710/0644* (2013.01); *B60W 2710/0666* (2013.01)

(58) Field of Classification Search
CPC ...... B60W 20/00; B60W 20/10; B60W 10/06; B60W 10/08; B60W 30/182; B60W 2510/0638
See application file for complete search history.

(56) References Cited

U.S. PATENT DOCUMENTS

| | | | | |
|---|---|---|---|---|
| 2020/0298824 A1* | 9/2020 | Yonezawa | ............. | B60W 20/15 |
| 2020/0307547 A1* | 10/2020 | Yonezawa | ............. | B60W 20/16 |
| 2020/0309005 A1* | 10/2020 | Yonezawa | ............. | B60W 20/15 |
| 2020/0317186 A1* | 10/2020 | Yonezawa | ............. | B60W 10/08 |
| 2020/0361443 A1* | 11/2020 | Itagaki | ................... | F02D 41/10 |
| 2021/0164562 A1* | 6/2021 | Tabata | .................... | F16H 61/12 |

FOREIGN PATENT DOCUMENTS

JP 2015-058924 A 3/2015

* cited by examiner

*Primary Examiner* — John Kwon
(74) *Attorney, Agent, or Firm* — Sughrue Mion, PLLC

(57) ABSTRACT

A vehicle includes an engine, a first MG, a planetary gear mechanism to which the engine, the first MG, and a counter shaft are connected, and an HV-ECU configured to control the engine and the first MG. The engine includes a turbocharger that boosts suctioned air to be fed to the engine. The HV-ECU controls the engine and the first MG to initially decrease the engine's rotation speed and simultaneously increase torque that the engine generates when on a map indicating a relationship between the engine's rotation speed and torque generated by the engine the controller shifts a first operating point to a second operating point at which torque generated by the engine and the rotation speed of the engine are higher than at the first operating point and the turbocharger boosts suctioned air.

3 Claims, 9 Drawing Sheets

HYBRID VEHICLE

This nonprovisional application is based on Japanese Patent Application No. 2019-091103 filed with the Japan Patent Office on May 14, 2019, the entire contents of which are hereby incorporated by reference.

BACKGROUND

Field

The present disclosure relates to a hybrid vehicle, and more specifically to a hybrid vehicle including an internal combustion engine with a forced induction device.

Description of the Background Art

Japanese Patent Laying-Open No. 2015-058924 discloses a hybrid vehicle having mounted therein an internal combustion engine equipped with a turbo forced induction device, and a motor generator.

SUMMARY

The hybrid vehicle disclosed in Japanese Patent Application Laid-Open No. 2015-58924 can apply torque generated by a motor generator to compensate for a delay of a response of torque generated by the internal combustion engine that is attributed to a delay of a response of boost pressure of the forced induction device. However, this does not decrease the delay per se of the response of the torque generated by the internal combustion engine.

The present disclosure has been made in order to solve the above-described problem, and an object thereof is to provide a hybrid vehicle including an internal combustion engine with a forced induction device that can reduce delay of a response of torque generated by the internal combustion engine.

A hybrid vehicle according to the present disclosure comprises: an internal combustion engine; a rotating electric machine; a planetary gear mechanism to which the internal combustion engine, the rotating electric machine, and an output shaft are connected; and a controller that controls the internal combustion engine and the rotating electric machine. The internal combustion engine includes a forced induction device that boosts suctioned air to be fed to the internal combustion engine. The controller controls the internal combustion engine and the rotating electric machine to initially decrease a rotation speed of the internal combustion engine and simultaneously increase torque that the internal combustion engine generates when the controller shifts a first operating point to a second operating point on a map indicating a relationship between the rotation speed and generated torque of the internal combustion engine, the rotation speed and generated torque of the internal combustion engine at the second operating point being higher than those at the first operating point, the forced induction device boosting suctioned air at the second operating point.

According to this configuration, initially decreasing the rotation speed of the internal combustion engine allows more efficient introduction of air into a cylinder of the internal combustion engine, which in turn increases pressure of the cylinder and hence torque generated by the internal combustion engine. Further, as torque generated by the internal combustion engine increases, the rotating electric machine generates increased power, which can be used for driving the rotating electric machine, and hence help to increase torque that the internal combustion engine generates. As a result, the hybrid vehicle including the internal combustion engine with the forced induction device can reduce delay of a response of torque generated by the internal combustion engine.

Preferably, after the controller decreases the rotation speed of the internal combustion engine, the controller increases the rotation speed to a rotation speed indicated by the second operating point. According to this configuration, the rotation speed of the internal combustion engine can be increased to the rotation speed indicated by the second operating point.

Preferably, the controller initially decreases the rotation speed of the internal combustion engine by controlling rotation speed of the rotating electric machine. According to this configuration, the rotation speed of the internal combustion engine can be controlled with precision.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
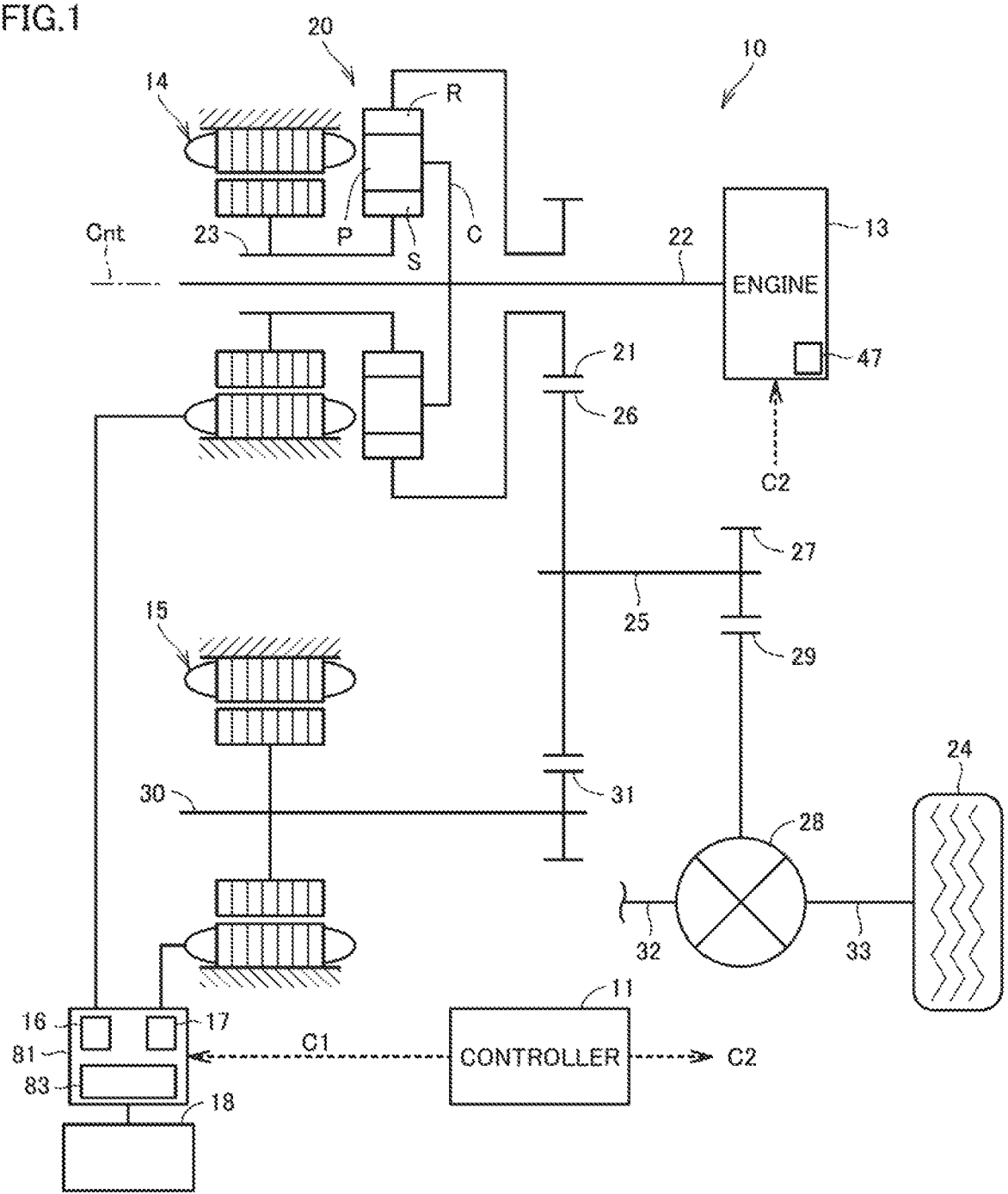
FIG. 1 is a diagram showing an exemplary configuration of a drive system of a hybrid vehicle according to an embodiment of the present disclosure.

An embodiment of the present disclosure will be described in detail below with reference to the drawings. The same or corresponding elements in the drawings have the same reference characters allotted and description thereof will not be repeated.

<Drive System of Hybrid Vehicle>

FIG. 1 is a diagram showing an exemplary configuration of a drive system of a hybrid vehicle (which is simply denoted as a vehicle below) 10 according to an embodiment of the present disclosure. As shown in FIG. 1, vehicle 10 includes as a drive system, a controller 11 as well as an engine 13, a first motor generator (which is denoted as a first MG below) 14, and a second motor generator (which is denoted as a second MG below) 15 that serve as motive power sources for travelling. Engine 13 includes a turbocharger 47.

First MG 14 and second MG 15 each perform a function as a motor that outputs torque by being supplied with driving electric power and a function as a generator that generates electric power by being supplied with torque. An alternating current (AC) rotating electric machine is employed for first MG 14 and second MG 15. The AC rotating electric machine is, for example, a permanent magnet type or similar synchronous motor including a rotor having a permanent magnet embedded, or an induction motor.

First MG 14 and second MG 15 are electrically connected to a battery 18 with a power control unit (PCU) 81 being interposed. PCU 81 includes a first inverter 16 that supplies and receives electric power to and from first MG 14, a second inverter 17 that supplies and receives electric power to and from second MG 15, battery 18, and a converter 83 that supplies and receives electric power to and from first inverter 16 and second inverter 17.

For example, converter 83 can up-convert electric power from battery 18 and supply up-converted electric power to first inverter 16 or second inverter 17. Alternatively, converter 83 can down-convert electric power supplied from first inverter 16 or second inverter 17 and supply down-converted electric power to battery 18.

First inverter 16 can convert direct current (DC) power from converter 83 into AC power and supply AC power to first MG 14. Alternatively, first inverter 16 can convert AC power from first MG 14 into DC power and supply DC power to converter 83.

Second inverter 17 can convert DC power from converter 83 into AC power and supply AC power to second MG 15. Alternatively, second inverter 17 can convert AC power from second MG 15 into DC power and supply DC power to converter 83.

Battery 18 is a rechargeably configured electric power storage component. Battery 18 for example includes a rechargeable battery such as a lithium ion battery, a nickel metal hydride battery or the like, or a power storage element such as an electric double layer capacitor, or the like. The lithium ion secondary battery is a secondary battery in which lithium is adopted as a charge carrier, and may include not only a general lithium ion secondary battery containing a liquid electrolyte but also what is called an all-solid-state battery containing a solid electrolyte.

Battery 18 can store power generated by first MG 14 and received via first inverter 16 and can supply the stored power to second MG 15 via second inverter 17. Further, battery 18 can also store power generated by second MG 15 when the vehicle is decelerated, and received via second inverter 17, and can also supply the stored power to first MG 14 via first inverter 16 when engine 13 is started.

PCU 81 charges battery 18 with electric power generated by first MG 14 or second MG 15 or drives first MG 14 or second MG 15 with electric power from battery 18.

For battery 18, an allowable value Win is determined for power charged to battery 18 and an allowable value Wout is determined for power discharged from battery 18. Win and Wout are reduced: as a ratio of a remaining amount of charge to the full charge capacity of battery 18, or a state of charge (SOC), is reduced; the temperature of battery 18 is lower; to suppress high-rate deterioration caused as battery 18 is charged/discharged rapidly (or at a high rate); and so forth. Controller 11 controls charging/discharging so that battery 18 is neither charged with power exceeding Win nor discharges power exceeding Wout.

Engine 13 and first MG 14 are coupled to a planetary gear mechanism 20. Planetary gear mechanism 20 transmits drive torque output from engine 13 by splitting drive torque into drive torque to first MG 14 and drive torque to an output gear 21. Planetary gear mechanism 20 includes a single-pinion planetary gear mechanism and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Engine 13 has output shaft 22 coupled to carrier C. A rotor shaft 23 of first MG 14 is coupled to sun gear S. Ring gear R is coupled to output gear 21.

Carrier C to which torque output from engine 13 is transmitted serves as an input element, ring gear R that outputs torque to output gear 21 serves as an output element, and sun gear S to which rotor shaft 23 is coupled serves as a reaction force element. That is, planetary gear mechanism 20 divides an output of engine 13 for the side of first MG 14 and the side of output gear 21. First MG 14 is controlled to output torque in accordance with torque output from engine 13.

A countershaft 25 is arranged in parallel to axis Cnt. Countershaft 25 is attached to a driven gear 26 meshed with output gear 21. A drive gear 27 is attached to countershaft 25, and drive gear 27 is meshed with a ring gear 29 in a differential gear 28 representing a final reduction gear. A drive gear 31 attached to a rotor shaft 30 in second MG 15 is meshed with driven gear 26. Therefore, torque output from second MG 15 is added at driven gear 26 to torque output from output gear 21. Torque thus combined is transmitted to drive wheel 24 with driveshafts 32 and 33 extending laterally from differential gear 28 being interposed. As torque is transmitted to drive wheel 24, driving force is generated in vehicle 10.

<Configuration of Engine>

Figure 2:
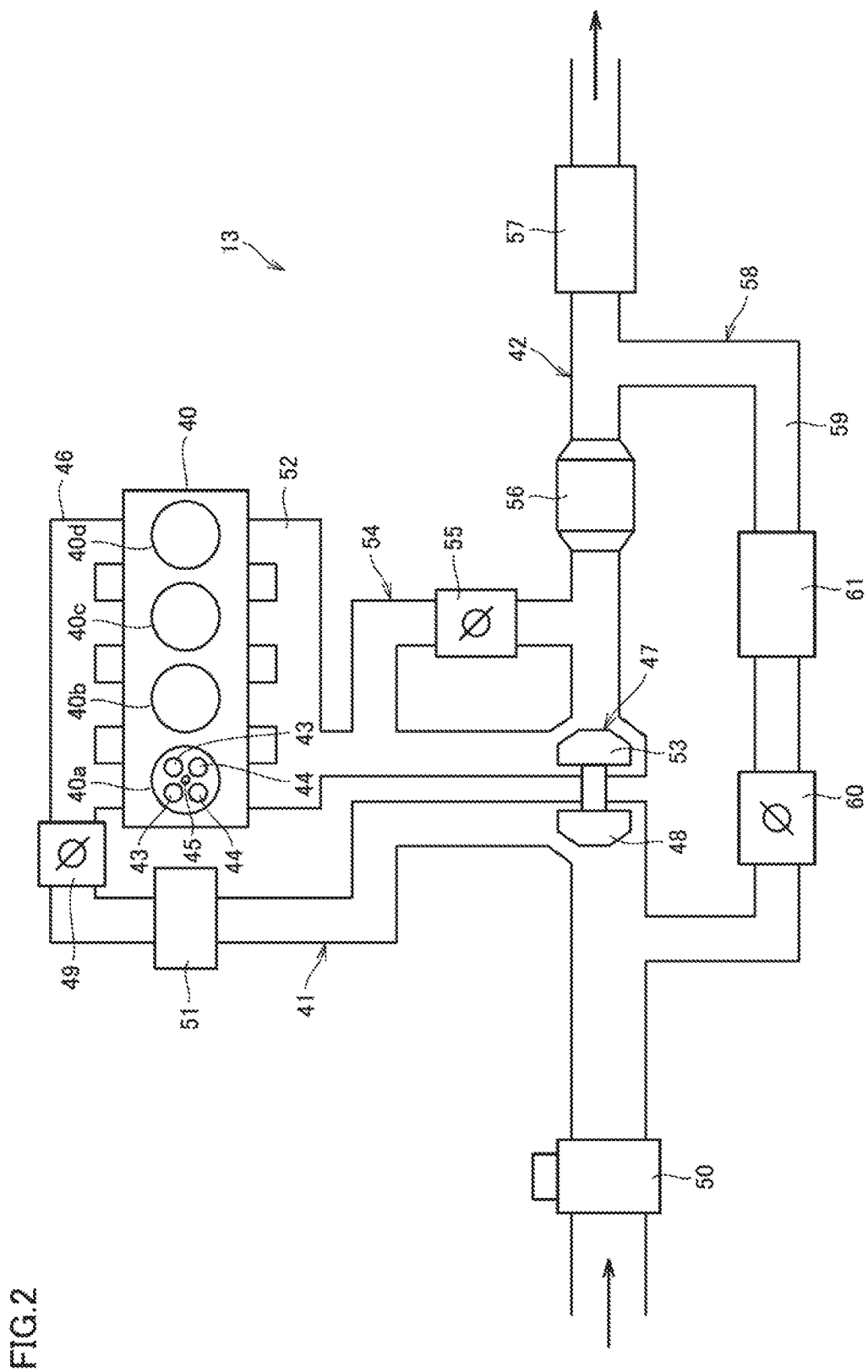
FIG. 2 is a diagram showing an exemplary configuration of an engine including a turbocharger.

FIG. 2 is a diagram showing an exemplary configuration of engine 13 including turbocharger 47. Engine 13 is, for example, an in-line four-cylinder spark ignition internal combustion engine. As shown in FIG. 2, engine 13 includes, for example, an engine main body 40 formed with four cylinders 40a, 40b, 40c, and 40d being aligned in one direction.

One ends of intake ports and one ends of exhaust ports formed in engine main body 40 are connected to cylinders 40a, 40b, 40c, and 40d. One end of the intake port is opened and closed by two intake valves 43 provided in each of cylinders 40a, 40b, 40c, and 40d, and one end of the exhaust port is opened and closed by two exhaust valves 44 provided in each of cylinders 40a, 40b, 40c and 40d. The other ends of the intake ports of cylinders 40a, 40b, 40c, and 40d are connected to an intake manifold 46. The other ends of the exhaust ports of cylinders 40a, 40b, 40c, and 40d are connected to an exhaust manifold 52.

In the present embodiment, engine 13 is, for example, a direct injection engine and fuel is injected into each of cylinders 40a, 40b, 40c, and 40d by a fuel injector (not shown) provided at the top of each cylinder. An air fuel mixture of fuel and intake air in cylinders 40a, 40b, 40c, and 40d is ignited by an ignition plug 45 provided in each of cylinders 40a, 40b, 40c, and 40d.

FIG. 2 shows intake valve 43, exhaust valve 44, and ignition plug 45 provided in cylinder 40a and does not show intake valve 43, exhaust valve 44, and ignition plug 45 provided in other cylinders 40b, 40c, and 40d.

Engine 13 is provided with turbocharger 47 that uses exhaust energy to boost suctioned air. Turbocharger 47 includes a compressor 48 and a turbine 53.

An intake air passage 41 has one end connected to intake manifold 46 and the other end connected to an air inlet. Compressor 48 is provided at a prescribed position in intake air passage 41. An air flow meter 50 that outputs a signal in accordance with a flow rate of air that flows through intake air passage 41 is provided between the other end (air inlet) of intake air passage 41 and compressor 48. An intercooler 51 that cools intake air pressurized by compressor 48 is disposed in intake air passage 41 provided downstream from compressor 48. An intake throttle valve (throttle valve) 49 that can regulate a flow rate of intake air that flows through intake air passage 41 is provided between intercooler 51 and intake manifold 46 of intake air passage 41.

An exhaust passage 42 has one end connected to exhaust manifold 52 and the other end connected to a muffler (not shown). Turbine 53 is provided at a prescribed position in exhaust passage 42. In exhaust passage 42, a bypass passage 54 that bypasses exhaust upstream from turbine 53 to a portion downstream from turbine 53 and a waste gate valve 55 provided in bypass passage 54 and capable of regulating a flow rate of exhaust guided to turbine 53 are provided. Therefore, a flow rate of exhaust that flows into turbine 53, that is, a boost pressure for suctioned air, is regulated by controlling a position of waste gate valve 55. Exhaust that passes through turbine 53 or waste gate valve 55 is purified by a start-up catalytic converter 56 and an aftertreatment apparatus 57 provided at prescribed positions in exhaust passage 42, and thereafter emitted into the atmosphere. Start-up catalytic converter 56 and aftertreatment apparatus 57 include a three-way catalyst for example.

Start-up catalytic converter 56 is provided at an upstream portion (a portion closer to the combustion chamber) of exhaust passage 42, and accordingly, it is heated to activation temperature within a short period of time after engine 13 is started. Furthermore, aftertreatment apparatus 57 located downstream purifies HC, CO and NOx that could not be purified by startup catalytic converter 56.

Engine 13 is provided with an exhaust gas recirculation (EGR) apparatus 58 that has exhaust flow into intake air passage 41. EGR apparatus 58 includes an EGR passage 59, an EGR valve 60, and an EGR cooler 61. EGR passage 59 allows some of exhaust to be taken out of exhaust passage 42 as EGR gas and guides EGR gas to intake air passage 41. EGR valve 60 regulates a flow rate of EGR gas that flows through EGR passage 59. EGR cooler 61 cools EGR gas that flows through EGR passage 59. EGR passage 59 connects a portion of exhaust passage 42 between start-up catalytic converter 56 and aftertreatment apparatus 57 to a portion of intake air passage 41 between compressor 48 and air flow meter 50.

<Configuration of Controller>

Figure 3:
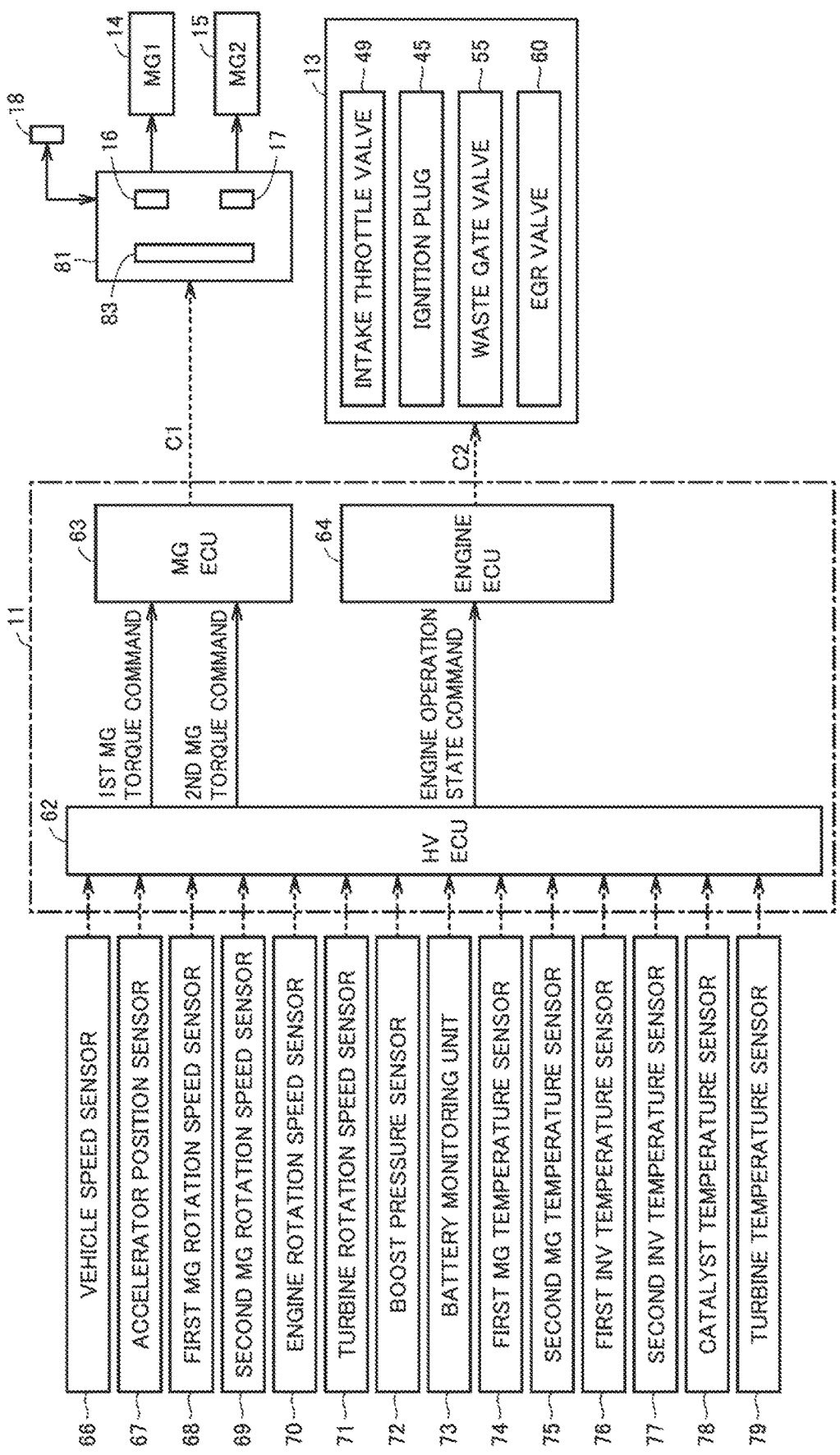
FIG. 3 is a block diagram showing an exemplary configuration of a controller.

FIG. 3 is a block diagram showing an exemplary configuration of controller 11. As shown in FIG. 3, controller 11 includes a hybrid vehicle (HV)-electronic control unit (ECU) 62, an MG-ECU 63, and an engine ECU 64.

HV-ECU 62 is a controller that controls engine 13, first MG 14, and second MG 15 in coordination. MG-ECU 63 is a controller that controls an operation by PCU 81. Engine ECU 64 is a controller that controls an operation by engine 13.

HV-ECU 62, MG-ECU 63, and engine ECU 64 each include an input and output apparatus that supplies and receives signals to and from various sensors and other ECUs that are connected, a storage that serves for storage of various control programs or maps (including a read only memory (ROM) and a random access memory (RAM)), a central processing unit (CPU) that executes a control program, and a counter that counts time.

A vehicle speed sensor 66, an accelerator position sensor 67, a first MG rotation speed sensor 68, a second MG rotation speed sensor 69, an engine rotation speed sensor 70, a turbine rotation speed sensor 71, a boost pressure sensor 72, a battery monitoring unit 73, a first MG temperature sensor 74, a second MG temperature sensor 75, a first INV temperature sensor 76, a second INV temperature sensor 77, a catalyst temperature sensor 78, a turbine temperature sensor 79 and an atmospheric pressure sensor 80 are connected to HV-ECU 62.

Vehicle speed sensor 66 detects a speed of vehicle 10 (vehicle speed). Accelerator position sensor 67 detects an amount of pressing of an accelerator pedal (accelerator position). First MG rotation speed sensor 68 detects a rotation speed of first MG 14. Second MG rotation speed sensor 69 detects a rotation speed of second MG 15. Engine rotation speed sensor 70 detects a rotation speed of output shaft 22 of engine 13 (engine rotation speed). Turbine rotation speed sensor 71 detects a rotation speed of turbine 53 of turbocharger 47. Boost pressure sensor 72 detects a boost pressure of engine 13. First MG temperature sensor 74 detects an internal temperature of first MG 14 such as a temperature associated with a coil or a magnet. Second MG temperature sensor 75 detects an internal temperature of second MG 15 such as a temperature associated with a coil or a magnet. First INV temperature sensor 76 detects a temperature of first inverter 16 such as a temperature associated with a switching element. Second INV temperature sensor 77 detects a temperature of second inverter 17 such as a temperature associated with a switching element. Catalyst temperature sensor 78 detects a temperature of aftertreatment apparatus 57. Turbine temperature sensor 79 detects a temperature of turbine 53. Various sensors output signals indicating results of detection to HV-ECU 62.

Battery monitoring unit 73 obtains an SOC of battery 18 and outputs a signal indicating the obtained SOC to HV-ECU 62. Battery monitoring unit 73 includes, for example, a sensor that detects a current, a voltage, and a temperature of battery 18. Battery monitoring unit 73 obtains an SOC by calculating the SOC based on the detected current, voltage, and temperature of battery 18. Various known approaches such as an approach by accumulation of current values (coulomb counting) or an approach by estimation of an open circuit voltage (OCV) can be adopted as a method of calculating an SOC.

<Control of Travelling of Vehicle>

Vehicle 10 configured as above can be set or switched to such a travelling mode as a hybrid (HV) travelling mode in which engine 13 and second MG 15 serve as motive power sources and an electric (EV) travelling mode in which the vehicle travels with engine 13 remaining stopped and second MG 15 being driven by electric power stored in battery 18. Setting of and switching to each mode is made by HV-ECU 62. HV-ECU 62 controls engine 13, first MG 14, and second MG 15 based on the set or switched travelling mode.

The EV travelling mode is selected, for example, in a low-load operation region where a vehicle speed is low and requested driving force is low, and refers to a travelling mode in which an operation by engine 13 is stopped and second MG 15 outputs driving force.

The HV travelling mode is selected in a high-load operation region where a vehicle speed is high and requested driving force is high, and refers to a travelling mode in which combined torque of drive torque of engine 13 and drive torque of second MG 15 is output.

In the HV travelling mode, in transmitting drive torque output from engine 13 to drive wheel 24, first MG 14 applies reaction force to planetary gear mechanism 20. Therefore, sun gear S functions as a reaction force element. In other words, in order to apply engine torque to drive wheel 24, first MG 14 is controlled to output reaction torque against engine torque. In this case, regenerative control in which first MG 14 functions as a generator can be carried out.

Control of engine 13, first MG 14, and second MG 15 in coordination while vehicle 10 operates will be described below.

HV-ECU 62 calculates requested driving force based on an accelerator position determined by an amount of pressing of the accelerator pedal. HV-ECU 62 calculates requested travelling power of vehicle 10 based on the calculated requested driving force and a vehicle speed. HV-ECU 62 calculates a value resulting from addition of requested charging and discharging power of battery 18 to requested travelling power as requested system power.

HV-ECU 62 determines whether or not activation of engine 13 has been requested in accordance with calculated requested system power. HV-ECU 62 determines that activation of engine 13 has been requested, for example, when requested system power exceeds a threshold value. When activation of engine 13 has been requested, HV-ECU 62 sets the HV travelling mode as the travelling mode. When activation of engine 13 has not been requested, HV-ECU 62 sets the EV travelling mode as the travelling mode.

When activation of engine 13 has been requested (that is, when the HV travelling mode is set), HV-ECU 62 calculates power requested of engine 13 (which is denoted as requested engine power below). For example, HV-ECU 62 calculates requested system power as requested engine power. For example, when requested system power exceeds an upper limit value of requested engine power, HV-ECU 62 calculates the upper limit value of requested engine power as requested engine power. HV-ECU 62 outputs calculated requested engine power as an engine operation state command to engine ECU 64.

Engine ECU 64 operates in response to the engine operation state command input from HV-ECU 62 to variously control each component of engine 13 such as intake throttle valve 49, ignition plug 45, waste gate valve 55, and EGR valve 60.

HV-ECU 62 sets based on calculated requested engine power, an operating point of engine 13 in a coordinate system defined by an engine rotation speed and engine torque. HV-ECU 62 sets, for example, an intersection between an equal power line equal in output to requested engine power in the coordinate system and a predetermined operating line as the operating point of engine 13.

The predetermined operating line represents a trace of variation in engine torque with variation in engine rotation speed in the coordinate system, and it is set, for example, by adapting the trace of variation in engine torque high in fuel efficiency through experiments.

HV-ECU 62 sets the engine rotation speed corresponding to the set operating point as a target engine rotation speed.

As the target engine rotation speed is set, HV-ECU 62 sets a torque command value for first MG 14 for setting a current engine rotation speed to the target engine rotation speed. HV-ECU 62 sets the torque command value for first MG 14, for example, through feedback control based on a difference between a current engine rotation speed and the target engine rotation speed.

HV-ECU 62 calculates engine torque to be transmitted to drive wheel 24 based on the set torque command value for first MG 14 and sets a torque command value for second MG 15 so as to fulfill requested driving force. HV-ECU 62 outputs set torque command values for first MG14 and second MG 15 as a first MG torque command and a second MG torque command to MG-ECU 63.

MG-ECU 63 calculates a current value corresponding to torque to be generated by first MG 14 and second MG 15 and a frequency thereof based on the first MG torque command and the second MG torque command input from HV-ECU 62, and outputs a signal including the calculated current value and the frequency thereof to PCU 81.

HV-ECU 62 requests to increase boost pressure when the engine torque corresponding to the set operating point exceeds a threshold value. Note that this is not exclusive, and for example, a request to increase boost pressure may be made when the accelerator position exceeds a threshold value for starting turbocharger 47 or a request to increase boost pressure may be made when requested engine power exceeds a threshold value.

Though FIG. 3 illustrates a configuration in which HV-ECU 62, MG-ECU 63, and engine ECU 64 are separately provided by way of example, the ECUs may be integrated as a single ECU.

Figure 4:
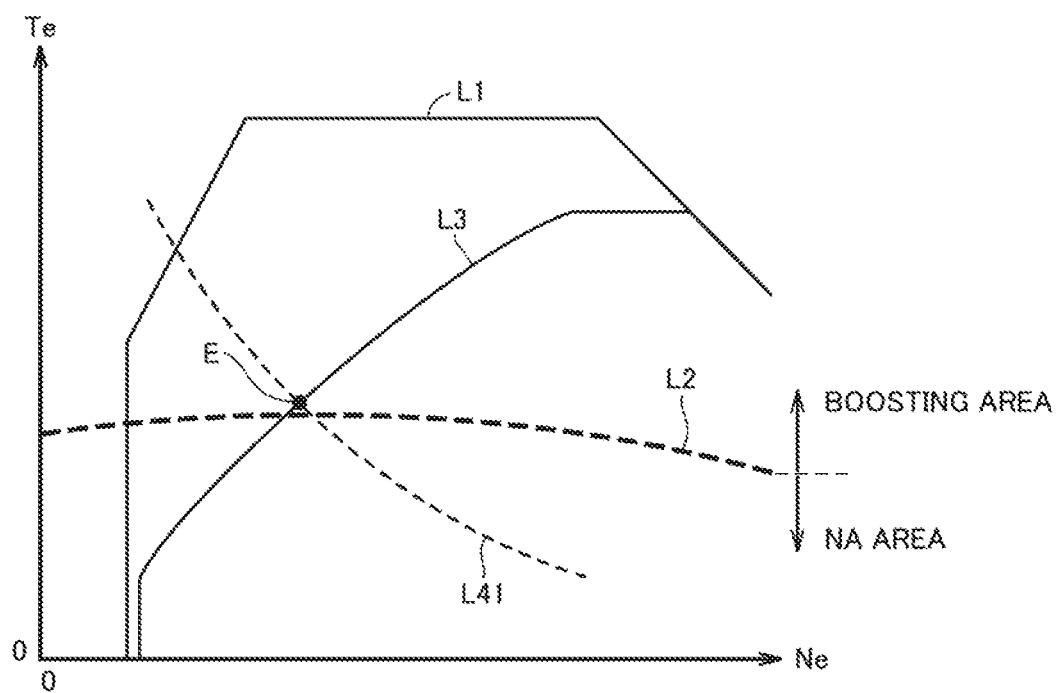
FIG. 4 is a diagram for illustrating an operating point of the engine.

FIG. 4 is a diagram for illustrating an operating point of engine 13. In FIG. 4, the vertical axis represents torque Te of engine 13, and the horizontal axis represents an engine speed Ne of engine 13.

Referring to FIG. 4, a line L1 represents a maximum torque that engine 13 can output. A dotted line L2 represents a line (a boost line) at which turbocharger 47 starts boosting. When torque Te of engine 13 exceeds boost line L2, waste gate valve 55, having been fully open, is operated in the closing direction. Adjusting the angle of opening of waste gate valve 55 can adjust the flow rate of exhaust air flowing into turbine 53 of turbocharger 47 and the boost pressure for the suctioned air can be adjusted through compressor 48. When torque Te falls below boost line L2, waste gate valve 55 can be fully opened to inactivate turbocharger 47.

In hybrid vehicle 10, engine 13 and first MG 14 can be controlled to change the operating point of engine 13. Also, the final vehicle driving force is adjustable by controlling second MG 15, and accordingly, the operating point of engine 13 can be moved while the vehicle drive force is adjusted (e.g., maintained). A way of moving the operating point of engine 13 will now be described.

Figure 5:
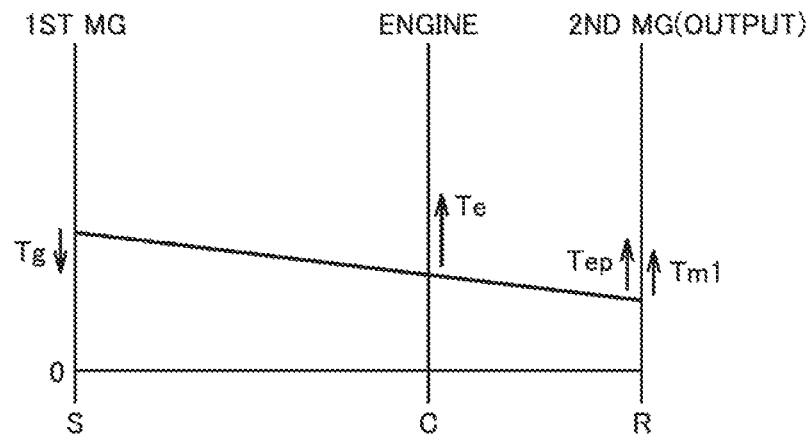
FIG. 5 is a nomographic chart representing a relationship between rotation speed and torque that the engine, a first MG, and an output element have.
Figure 6:
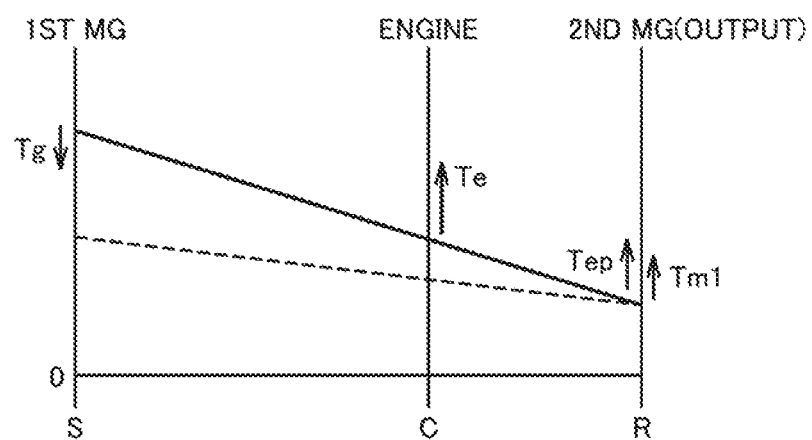
FIG. 6 is a nomographic chart representing a relationship between rotation speed and torque that the engine, the first MG, and the output element have.
Figure 7:
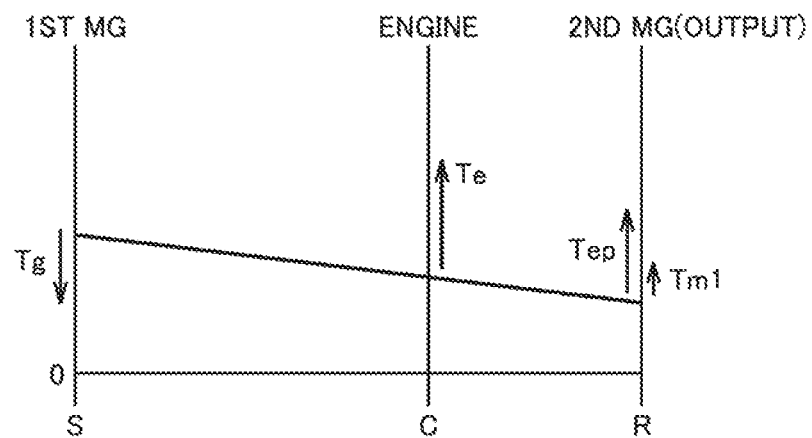
FIG. 7 is a nomographic chart representing a relationship between rotation speed and torque that the engine, the first MG, and the output element have.

FIGS. 5 to 7 are nomographic charts showing the relationship between the rotation speed and torque of engine 13, first MG 14, and the output element. FIG. 5 is a nomographic chart showing the relationship between the rotation speed and torque of the respective elements before the operating point of engine 13 is changed. FIG. 6 is a nomographic chart showing the relationship between the rotation speed and torque of the respective elements when engine speed Ne of engine 13 is increased from the state shown in FIG. 5. FIG. 7 is a nomographic chart showing the relationship between the rotation speed and torque of the respective elements when torque Te of engine 13 is increased from the state shown in FIG. 5.

In each of FIGS. 5 to 7, the output element is ring gear R coupled to countershaft 25 (FIG. 1). Positions on the vertical axis represent the rotation speeds of the respective elements (engine 13, first MG 14, and second MG 15), and spacings between the vertical axes represent the gear ratio of planetary gear mechanism 20. "Te" represents a torque of engine 13, and "Tg" represents a torque of first MG 14. "Tep" represents a direct torque of engine 13, and "Tm1" represents a torque obtained by converting torque Tm of second MG 15 on the output element. The sum of Tep and Tm1 corresponds to a torque output to a drive shaft (countershaft 25). The up arrow represents a positive-going torque, a down arrow represents a negative-going torque, and an arrow length represents torque magnitude.

Referring to FIGS. 5 and 6, the dotted line in FIG. 6 represents the relationship before engine speed Ne is increased, and corresponds to the line shown in FIG. 5. The relationship between torque Te of engine 13 and torque Tg of first MG 14 is uniquely determined by the gear ratio of planetary gear mechanism 20. Thus, first MG 14 can be controlled such that the rotation speed of first MG 14 increases with torque Tg of first MG 14 maintained, thereby increasing engine speed Ne of engine 13 with the driving torque maintained.

Also, referring to FIGS. 5 and 7, engine 13 can be controlled such that the output (power) of engine 13 is increased, thereby increasing torque Te of engine 13. At this time, torque Tg of first MG 14 can be increased such that the rotation speed of first MG 14 does not increase, thereby increasing torque Te of engine 13 with engine speed Ne of engine 13 maintained. Since engine direct torque Tep increases along with an increase in torque Te, second MG 15 can be controlled such that torque Tm1 decreases, thereby maintaining the torque of the drive shaft.

When torque Te of engine 13 is increased, torque Tg of first MG 14 increases, leading to an increase in the power generated by first MG 14. At this time, if charging of battery 18 is not restricted, battery 18 can be charged with the generated power which has been increased.

Although not particularly shown, controlling engine 13 can be controlled such that the output (power) of engine 13 decreases, thereby reducing torque Te of engine 13. At this time, torque Tg of first MG 14 can be reduced such that the rotation speed of first MG 14 does not decrease, thereby reducing torque Te of engine 13 with engine speed Ne of engine 13 maintained. In this case, torque Tg of first MG 14 decreases, leading to a decrease in the power generated by first MG 14. At this time, if discharging of battery 18 is not restricted, discharging by battery 18 can be increased to compensate for an amount of the decrease in the power generated by first MG 14.

Referring to FIG. 4 again, a line L3 represents a recommended operation line of engine 13. In other words, engine 13 is usually controlled to move on the recommended operation line (line L3) in which the operating point determined by torque Te and engine speed Ne is set in advance.

Figure 8:
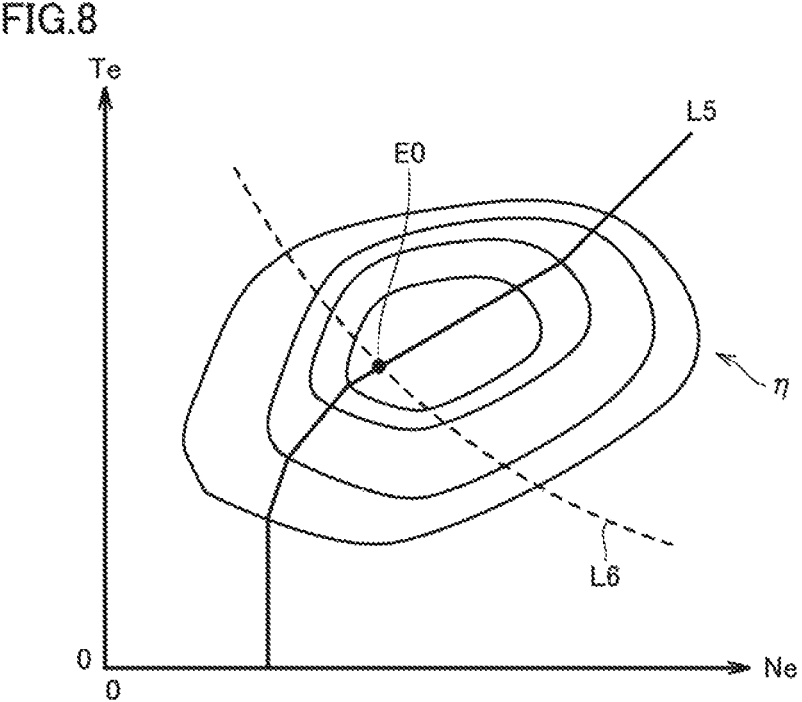
FIG. 8 shows an optimum fuel efficiency line which is an exemplary recommended operation line for the engine.

FIG. 8 shows an optimum fuel efficiency line which is an example recommended operation line of engine 13. Referring to FIG. 8, a line L5 is an operation line set in advance by initial assessment test or simulation to obtain minimum fuel consumption of engine 13. The operating point of engine 13 is controlled to be located on line L5, leading to optimum (minimum) fuel consumption of engine 13 for the requested power. A dotted line L6 is an isopower line of engine 13 which corresponds to the requested power. Note that in FIG. 4, a dotted line L41 represents an isopower line. Fuel consumption of engine 13 is optimized (minimized) by controlling engine 13 such that the operating point of engine 13 is a point at intersection E0 of dotted line L6 with line L5.

A group of closed curves η in the figure shows an isoefficiency line of engine 13, in which the efficiency of engine 13 is higher as closer to the center.

<Description of Basic Computation Process of Operating Point>

Figure 9:
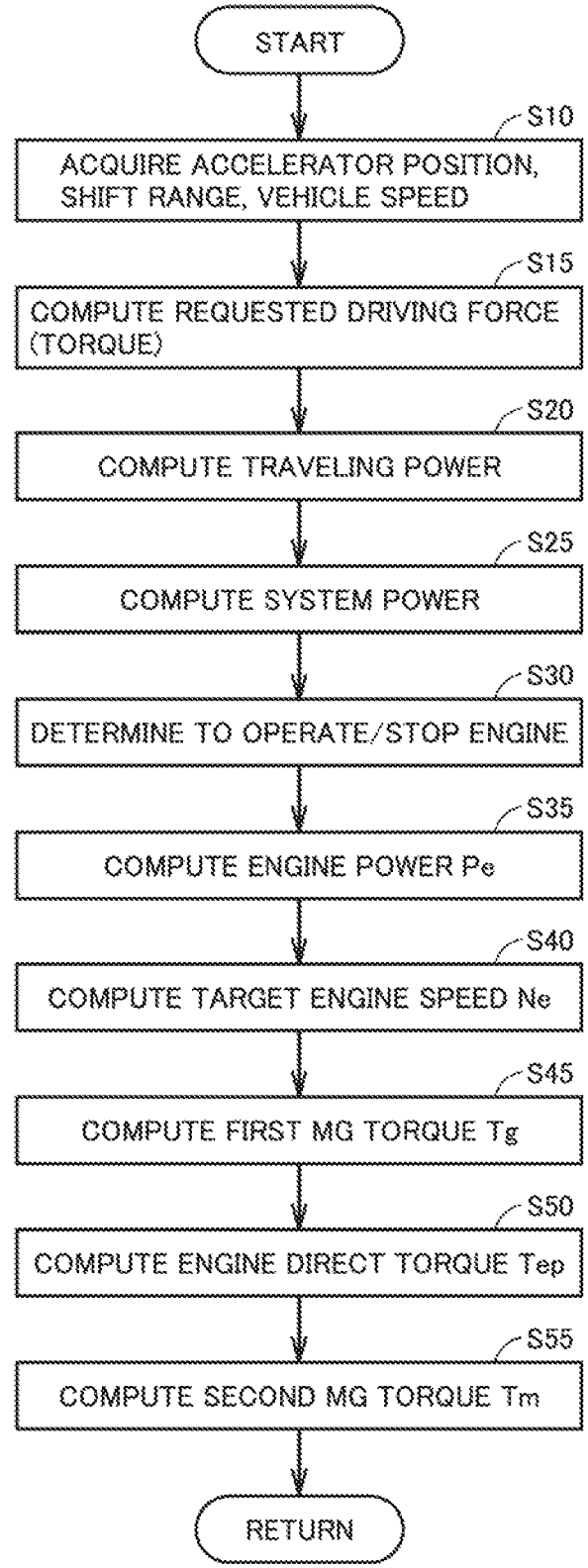
FIG. 9 is a flowchart of an example of a basic computation process for determining operating points for the engine, the first MG, and the second MG.

FIG. 9 is a flowchart showing an example basic computation process for determining the operating points of engine 13, first MG 14, and second MG 15. A series of steps shown in this flowchart is repeatedly performed for each prescribed period in HV-ECU 62.

Referring to FIG. 9, HV-ECU 62 acquires information on, for example, an accelerator position, a shift range being selected, and a vehicle speed (step S10). The accelerator position is detected by accelerator position sensor 67, and the vehicle speed is detected by vehicle speed sensor 66. The rotation speed of a drive shaft or propeller shaft may be used in place of the vehicle speed.

HV-ECU 62 then computes a requested driving force (torque) from the information acquired at step S10 using a drive force map prepared in advance per shift range, which indicates the relationship among requested driving force, accelerator position, and vehicle speed (step S15). HV-ECU 62 then multiplies the computed requested driving force by the vehicle speed and adds prescribed loss power to a result of the multiplication, thereby computing traveling power of the vehicle (step S20).

Then, when there is a charge/discharge request (power) of battery 18, HV-ECU 62 computes a value obtained by adding the charge/discharge request (charge has a positive value) to the computed traveling power as system power (step S25). For example, the charge/discharge request can have a greater positive value as the SOC of battery 18 is lower and have a negative value when the SOC is high.

HV-ECU 62 then determines to operate/stop engine 13 in accordance with the computed system power and traveling power (step S30). For example, when system power is greater than a first threshold or when traveling power is greater than a second threshold, HV-ECU 62 determines to operate engine 13.

Then, when determining to operate engine 13, HV-ECU 62 performs the process of step S35 and the following processes (HV traveling mode). Although not specifically shown, when determining to stop engine 13 (EV traveling mode), HV-ECU 62 computes torque Tm of second MG 15 based on the requested driving force.

During operation of engine 13 (during the HV traveling mode), HV-ECU 62 computes power Pe of engine 13 from the system power computed at step S25 (step S35). Power Pe is computed by, for example, making various corrections to or imposing limitations on system power. The computed power Pe of engine 13 is output to engine ECU 64 as a power command of engine 13.

HV-ECU 62 then computes an engine speed Ne (target engine rotation speed) of engine 13 (step S40). In the present embodiment, engine speed Ne is computed such that the operating point of engine 13 is located on line L3 (recommended operation line) shown in, for example, FIG. 4. Specifically, the relationship between power Pe and engine speed Ne in which the operating point of engine 13 is located on line L3 (recommended operation line) is prepared as a map or the like in advance, and engine speed Ne is computed from power Pe computed at step S35 using the map. When engine speed Ne is determined, torque Te (target engine torque) of engine 13 is also determined. Consequently, the operating point of engine 13 is determined.

HV-ECU 62 then computes torque Tg of first MG 14 (step S45). Torque Te of engine 13 can be estimated from engine speed Ne of engine 13, and the relationship between torque Te and torque Tg is uniquely determined in accordance with the gear ratio of planetary gear mechanism 20, and thus, torque Tg can be computed from engine speed Ne. The computed torque Tg is output to MG-ECU 63 as a torque command of first MG 14.

HV-ECU 62 further computes engine direct torque Tep (step S50). Since the relationship between engine direct torque Tep and torque Te (or torque Tg) is uniquely determined in accordance with the gear ratio of planetary gear mechanism 20, engine direct torque Tep can be computed from the computed torque Te or torque Tg.

HV-ECU 62 finally computes torque Tm of second MG 15 (step S50). Torque Tm is determined such that the requested driving force (torque) computed at step S15 can be obtained, and can be computed by subtracting engine direct torque Tep from the requested driving force converted on the output shaft. The computed torque Tm is output to MG-ECU 63 as the torque command of second MG 15.

As described above, the operating point of engine 13 and the operating points of first MG 14 and second MG 15 are computed.

<Acceleration Control>

Vehicle 10 according to the present disclosure can apply torque generated by first MG 14 or second MG 15 to compensate for a delay of a response of torque generated by engine 13 that is attributed to a delay of a response of boost pressure of turbocharger 47. However, this does not decrease the delay per se of the response of the torque generated by engine 13.

Accordingly, with reference to a map shown in FIG. 4 showing a relationship between rotation speed of engine 13 and torque generated by engine 13 when HV-ECU 62 according to the present disclosure shifts a first operating point to a second operating point at which torque generated by engine 13 and rotation speed of engine 13 are higher than at the first operating point and turbocharger 47 starts boosting suctioned air HV-ECU 62 controls engine 13 and first MG 14 to initially decrease rotation speed of engine 13 and simultaneously increase torque that engine 13 generates.

Thus initially reducing the rotation speed of engine 13 allows more efficient introduction of air into cylinders 40a, 40b, 40c and 40d of engine 13, which in turn increases pressure of cylinders 40a, 40b, 40c and 40d and hence torque that engine 13 generates. Further, as torque generated by engine 13 increases, first MG 14 generates increased power, which can be used for driving second MG 15, and hence help to increase torque that engine 13 generates. As a result, vehicle 10 including engine 13 with turbocharger 47 can reduce delay of a response of torque generated by engine 13.

Figure 10:
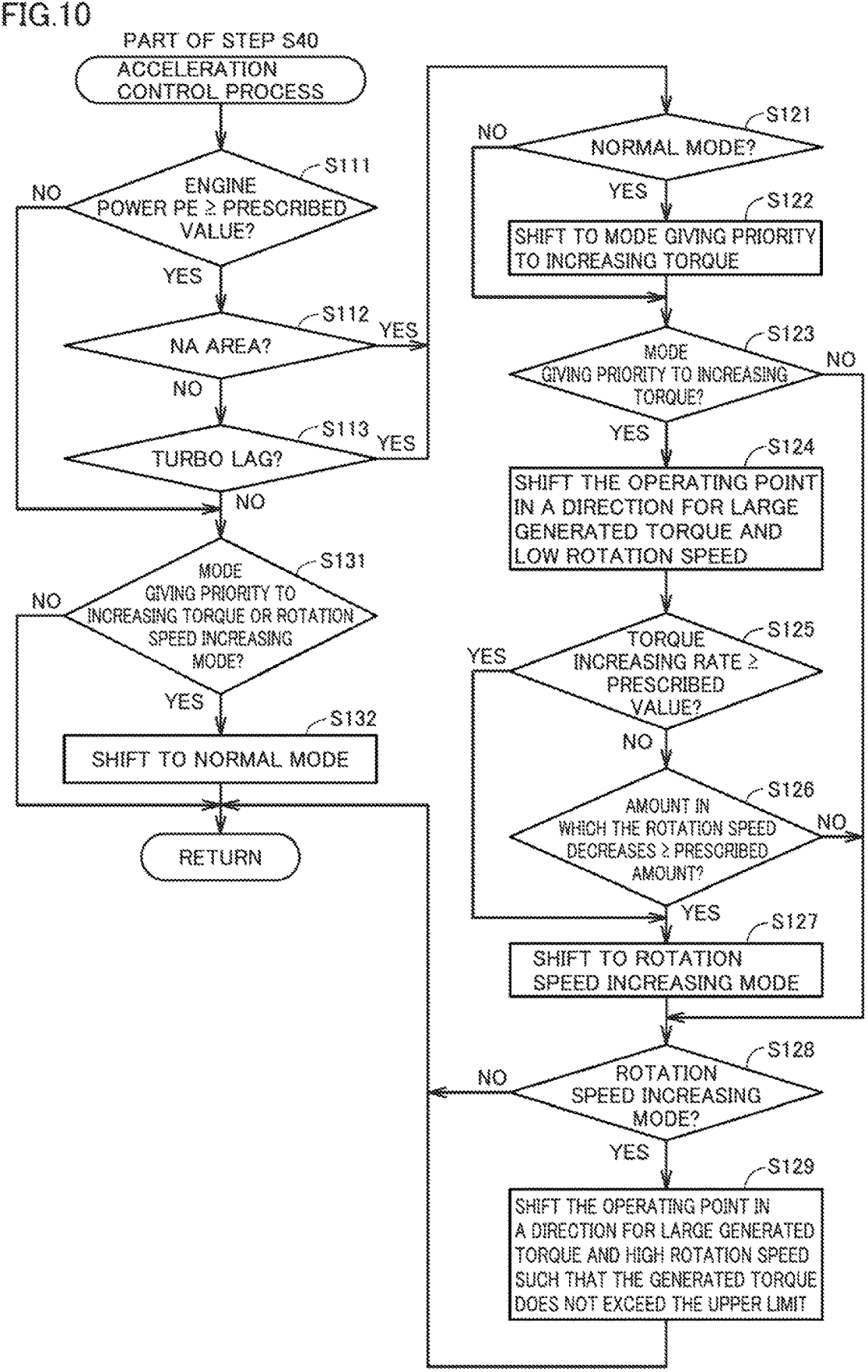
FIG. 10 is a flowchart of an acceleration control process according to the present embodiment.

Hereinafter, control in the present embodiment will be described. FIG. 10 is a flowchart of an acceleration control process according to the present embodiment. The acceleration control process is invoked and performed by a CPU of HV-ECU 62 as a part of step S40 of FIG. 9 periodically as prescribed for control.

Referring to FIG. 10, HV-ECU 62 determines whether engine power Pe calculated in step S35 is equal to or more than a prescribed value (step S111). The prescribed value is, for example, a value of generated torque corresponding to the current rotation speed of engine 13 on a boost line L2. When it is determined that engine power Pe is equal to or more than the prescribed value (YES in step S111), HV-ECU 62 determines whether on the FIG. 4 map an operating point falls within an NA (natural aspiration) area below the boost line L2 (Step S112).

When it is determined that the operating point does not fall within the NA area (NO in step S112), HV-ECU 62 determines whether a turbo lag is currently caused (step S113). For example, if a prescribed time has not elapsed since waste gate valve 55 in a fully opened position is started to operate in a direction to close it, it is determined that a turbo lag is currently caused. The prescribed time is, for example, an average time for which a turbo lag occurs in an actual machine test or a simulation test.

When it is determined that the operating point falls within the NA area (YES in step S112) and when it is determined that a turbo lag is currently caused (YES in step S113), HV-ECU 62 determines whether a mode for acceleration control is a normal mode (step S121). When the mode for acceleration control is the normal mode, an operating point of engine 13 is calculated as has been described with reference to FIG. 9 or the like.

When it is determined that the mode for acceleration control is the normal mode (YES in step S121), HV-ECU 62 shifts the mode for acceleration control to a mode giving priority to increasing torque (step S122). When the mode for acceleration control is the mode giving priority to increasing torque, the operating point of engine 13 is shifted in a direction for large generated torque and low rotation speed.

When it is determined that the mode for acceleration control is not the normal mode (NO in step S121), and after step S122, HV-ECU 62 determines whether the mode for acceleration control is the mode giving priority to increasing torque (step S123).

When it is determined that the mode for acceleration control is the mode giving priority to increasing torque (YES in step S123), HV-ECU 62 shifts the operating point of engine 13 in a direction for large generated torque and low rotation speed (step S124). Specifically, the rotation speed of engine 13 is reduced by controlling the rotation speed of first MG 14.

Figure 11:
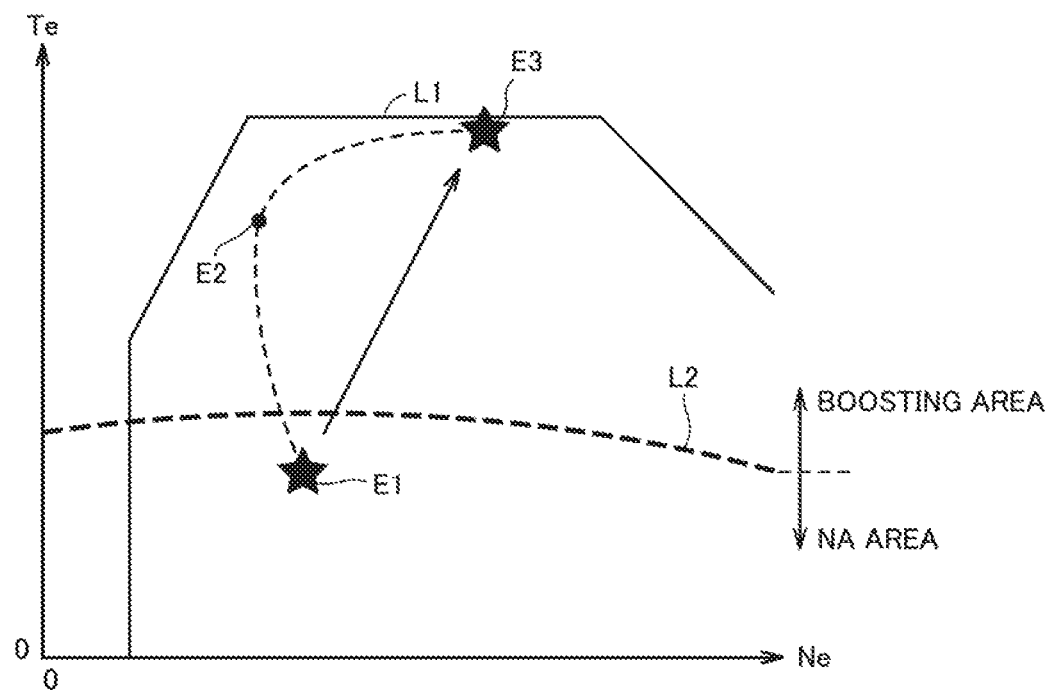
FIG. 11 is a diagram for illustrating how an operating point is shifted by control according to the present embodiment.

FIG. 11 is a diagram for illustrating how an operating point is shifted by control according to the present embodiment. Referring to FIG. 11, an operating point of engine 13 is shifted from an operating point E1 to an operating point E2 by performing step S124 periodically as prescribed for control.

Thus initially reducing the rotation speed of engine 13 allows more efficient introduction of air into cylinders 40a, 40b, 40c and 40d of engine 13, which in turn increases pressure of cylinders 40a, 40b, 40c and 40d and hence torque that engine 13 generates. Further, as torque generated by engine 13 increases, first MG 14 generates increased power, which can be used for driving second MG 15, and hence help to increase torque that engine 13 generates.

Returning to FIG. 10, HV-ECU 62 determines whether the generated torque indicated by the operating point increases at a rate equal to or higher than a prescribed value (step S125). When the generated torque indicated by the operating point increases at a rate less than the prescribed value, it is determined that a turbo lag is currently caused. Note that whether a turbo lag is currently caused may be determined by determining whether generated torque indicated by an operating point increases at a rate less than a prescribed value in step S113.

When it is determined that the generated torque indicated by the operating point increases at a rate less than the prescribed value (NO in step S125), HV-ECU 62 determines whether the rotation speed decreases in a prescribed amount or more after shifting is made to the mode giving priority to increasing torque (step S126). The prescribed amount is an amount for which torque that engine 13 generates is no longer expected to increase even when the rotation speed is decreased by the prescribed amount or more.

When it is determined that the generated torque indicated by the operating point increases at a rate equal to or higher than the prescribed value (YES in step S125), and when it is determined that the rotation speed decreases in the prescribed amount or more (YES in step S126), HV-ECU 62 shifts the mode for acceleration control to a rotation speed increasing mode (step S127). When the mode for acceleration control is the rotation speed increasing mode, the operating point is shifted in a direction for large generated torque and high rotation speed such that the generated torque indicated by the operating point of engine 13 does not exceed an upper limit.

When it is determined that the mode for acceleration control is not the mode giving priority to increasing torque (NO in step S123), when it is determined that the rotation speed decreases in an amount less than the prescribed amount (NO in step S126), and after step S127, HV-ECU 62 determines whether the mode for acceleration control is the rotation speed increasing mode (step S128).

When it is determined that the mode for acceleration control is the rotation speed increasing mode (YES in step S128), HV-ECU 62 moves the operating point in a direction for large generated torque and high rotation speed such that the generated torque indicated by the operating point of engine 13 does not exceed the upper limit indicated in FIG. 4 by the line L1 (step S129).

Referring again to FIG. 11, step S129 is performed periodically as prescribed for control to shift the operating point of engine 13 from the operating point E2 to an operating point E3.

When it is determined that the mode for acceleration control is not the rotation speed increasing mode (NO at step S128), and after step S129, HV-ECU 62 returns to a process from which the acceleration control process is invoked.

When it is determined that engine power Pe is less than the prescribed value (NO in step S111), and when it is determined that no turbo lag is currently caused (NO in step S113), HV-ECU 62 determines whether the mode for acceleration control is the mode giving priority to increasing torque or the rotation speed increasing mode (step S131).

When HV-ECU 62 determines that the mode for acceleration control is the mode giving priority to increasing torque or the rotation speed increasing mode (YES in step S131), HV-ECU 62 shifts the mode for acceleration control to a normal mode (step S132).

When it is determined that the mode for acceleration control is neither the mode giving priority to increasing torque nor the rotation speed increasing mode (NO in step S131), and after step S132, HV-ECU 62 returns to the process from which the acceleration control process is invoked.

<Modification>

(1) In the above-described embodiment, as shown in FIG. 11, the operating point E1 at which acceleration is started falls within the NA area. However, the operating point E1 at which acceleration is started may fall within a boosting area exceeding the boost line L2.

(2) The above-described embodiment can be regarded as disclosure of a hybrid vehicle such as vehicle 10. Further, the above-described embodiment can be regarded as disclosure of a controller, such as HV-ECU 62, for a hybrid vehicle. Further, the above-described embodiment can be regarded as disclosure of a control method in which the controller performs the process shown in FIG. 10. Further, the above-described embodiment can be regarded as disclosure of a program of the acceleration control process shown in FIG. 10 and performed by the controller.

<Effect>

(1) As shown in FIGS. 1 to 3, vehicle 10 includes engine 13, first MG 14, planetary gear mechanism 20 to which engine 13, first MG 14, and counter shaft 25 are connected, and HV-ECU 62 configured to control engine 13 and first MG 14. As shown in FIGS. 1 and 2, engine 13 includes turbocharger 47 that boosts suctioned air to be fed to engine 13. As shown in FIGS. 10 and 11, with reference to a map representing a relationship between rotation speed of engine 13 and torque generated by engine 13 when HV-ECU 62 shifts the operating point E1 to the operating point E3 at which torque generated by engine 13 and rotation speed of engine 13 are higher than at the first operating point E1 and turbocharger 47 boosts suctioned air, HV-ECU 62 controls engine 13 and first MG 14 to initially decrease rotation speed of engine 13 and simultaneously increase torque that engine 13 generates.

Thus initially decreasing the rotation speed of engine 13 allows more efficient introduction of air into cylinders 40*a*, 40*b*, 40*c* and 40*d* of engine 13, which in turn increases pressure of cylinders 40*a*, 40*b*, 40*c* and 40*d* and hence torque that engine 13 generates. Further, as torque generated by engine 13 increases, first MG 14 generates increased power, which can be used for driving second MG 15, and hence help to increase torque that engine 13 generates. As a result, vehicle 10 including engine 13 with turbocharger 47 can reduce delay of a response of torque generated by engine 13.

(2) As shown in FIGS. 10 and 11, after HV-ECU 62 decreases the rotation speed of engine 13, HV-ECU 62 increases it to the rotation speed indicated by the operating point E3. Thus, the rotation speed of engine 13 can be increased to the rotation speed indicated by the operating point E3.

(3) As shown in FIGS. 5 to 7, HV-ECU 62 initially decreases the rotation speed of engine 13 by controlling the rotation speed of first MG 14. The rotation speed of engine 13 can be controlled with precision.

Although the embodiments of the present invention have been described, it should be considered that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A hybrid vehicle comprising:
   an internal combustion engine;
   a rotating electric machine;
   a planetary gear mechanism to which the internal combustion engine, the rotating electric machine, and an output shaft are connected; and
   a controller that controls the internal combustion engine and the rotating electric machine, wherein
   the internal combustion engine includes a forced induction device that boosts suctioned air to be fed to the internal combustion engine, and
   the controller controls the internal combustion engine and the rotating electric machine to initially decrease a rotation speed of the internal combustion engine and simultaneously increase torque that the internal combustion engine generates when the controller shifts a first operating point to a second operating point on a map indicating a relationship between the rotation speed and generated torque of the internal combustion engine, the rotation speed and generated torque of the internal combustion engine at the second operating point being higher than those at the first operating point, the forced induction device boosting the suctioned air at the second operating point.

2. The hybrid vehicle according to claim 1, wherein after the controller decreases the rotation speed of the internal combustion engine, the controller increases the rotation speed to a rotation speed indicated by the second operating point.

3. The hybrid vehicle according to claim 1, wherein the controller initially decreases the rotation speed of the internal combustion engine by controlling rotation speed of the rotating electric machine.

* * * * *